Sept. 17, 1929.  W. L. MARTIN  1,728,354
FRYING PAN
Filed Sept. 6, 1928
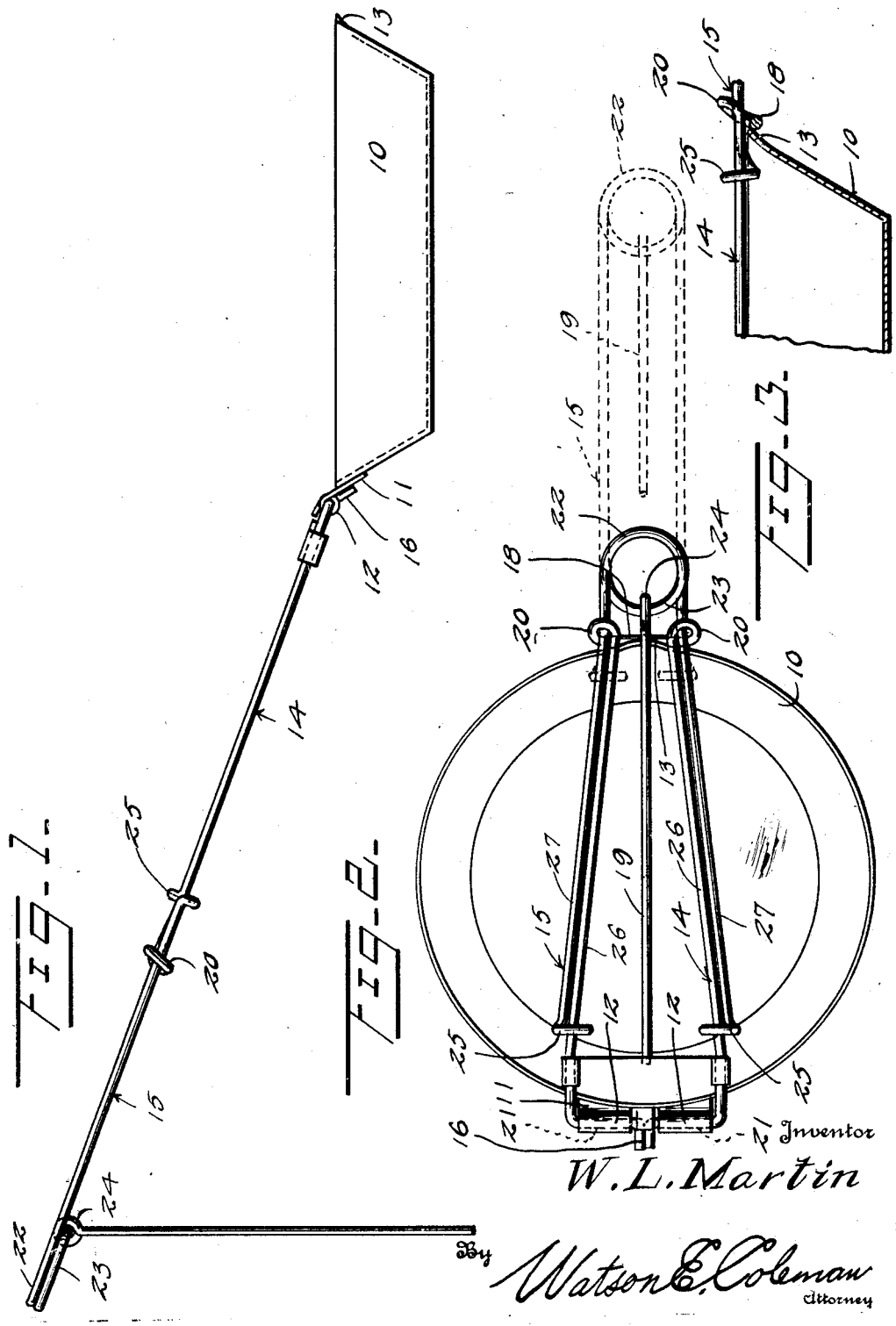

Patented Sept. 17, 1929.

1,728,354

UNITED STATES PATENT OFFICE.

WILLIAM L. MARTIN, OF SANFORD, COLORADO

FRYING PAN

Application filed September 6, 1928. Serial No. 304,271.

This invention relates to frying pans and more particularly to a handle structure for use in frying pans of such character that it may be folded to permit compact storage of the pan.

An important object of the invention is to provide a handle which of itself embodies a latching means for engagement with the pan, so that the pan may be rigidly mounted with respect to the handle to enable its ready manipulation.

A further object of the invention is to provide a handle which is pivotally connected with the pan and which has means for grasping the pan at the opposite edge thereof from the point of its pivotal connection, so that the handle may be secured across the pan.

A still further object of the invention is to provide in a construction of this character an arrangement such that the handle is extensible when it is disposed in either of its positions.

These and other objects I attain by the construction shown in the accompanying drawings, wherein for the purpose of illustration is shown a preferred embodiment of my invention and wherein:—

Figure 1 is a side elevation of a frying pan constructed in accordance with my invention;

Figure 2 is a plan view thereof illustrating a second position of the handle, the third position thereof being illustrated in dotted lines;

Figure 3 is a detail sectional view showing the manner of engagement of the cross bar with the lip.

Referring now more particularly to the drawings, the numeral 10 generally designates a frying pan which is preferably formed of slightly resilient material, so that the pan may be deformed a trifle. To one side of this pan, I secure a plate 11 embodying spaced hinge loops 12. Upon the opposite side of the pan I form a slightly out-turned lip 13. The handle comprises two slidably engaged sections 14 and 15, of which the section 14 pivotally engages in the hinge loops 12 at one end and has at said end a stop 16 adapted to engage the pan wall or the plate 11 and limit movement of the handle with relation to the pan when it occupies the position ordinarily occupied by a pan handle. The opposite end of this section includes a cross bar 18 adapted to engage the lip 13 when the handle is arranged across the pan, so that the section 14 may be held against the top of the pan. Engagement of this cross bar with the lip is attained by a slight deformation of the pan body, decreasing the normal distance between the outer edge of the lip and the pivotal connection of the section 14. The section 15 at its outer end has pivoted thereto a stake or support 19 adapted to be engaged in the ground and when engaged therein to prevent accidental tipping of the pan.

The preferred construction employed in the production of the sections 14 and 15 is that illustrated in the drawings. The section 14 is produced from a single length of wire whose central portion forms a bar 18. At the ends of this central portion, the wire is bent to form loops 20 and from the ends of these loops, the end portions diverge to a point adjacent their terminals. These terminals are inbent, as at 21, and directed through the eyes and have their tips out-turned to form the stop 16. The section 15 is likewise produced from a single section of wire, the central portion of which is bent to form a flat loop 22 providing a handle. The intermediate portion of this loop is formed as a subsidiary loop 23 in which an eye 24 formed upon the upper end of the stake 19 is engaged. The end portions of the wire are directed through the eyes 20 of the section 14 and are formed at their terminals with loops 25 slidably embracing the arms 26 produced by the end portions of the wire used in the formation of the section 14. The end portions or arms 27 normally converge, with the result that they have a tendency to frictionally resist collapsing of the sections upon one another and there will be no casual displacement of the sections with respect to one another after the handle has been extended.

It will be obvious from the foregoing that a handle construction of this character may be very readily and cheaply produced and will lend itself conveniently to use in the construction of frying pans or other cooking utensils employed in camping outfits. While I have above described the hinge connection of the handle with the pan as including a plate, which is attached to the pan, it will, of course, be obvious that this plate may, in some instances, be eliminated and the pan constructed with one element of the hinge.

It will also be obvious that the construction hereinbefore set forth is capable of a certain range of change and modification without materially departing from the spirit of the invention and I accordingly do not limit myself to such specific structure except as hereinafter claimed.

I claim:—

1. A cooking utensil having a lip, an extensible handle pivoted to the cooking utensil at a point diametrically opposed to the lip and shiftable about the pivot thereof from a position where it extends outwardly from the utensil to a position where it overlies the same, said handle including a lip engaging portion having latching engagement with the lip when the handle is in the last named position to thereby prevent displacement of the handle with relation to the pan, said handle being extensible in either of its positions and while said lip is in latching engagement with the handle.

2. A cooking utensil having a lip, a handle pivoted to the cooking utensil at a point diametrically opposed to the lip and shiftable about the pivot thereof from a position where it extends outwardly from the utensil to a position where it overlies the same, said handle including a lip engaging portion having latching engagement with the lip when the handle is in the last named position to thereby prevent displacement of the handle with relation to the pan, said handle being formed in two slidably engaged sections having a combined length when collapsed slightly greater than the diameter of the utensil, said sections being shiftable to extend the handle when in the last named position and while said lip has latching engagement with the handle.

3. A cooking utensil having a lip, a handle pivoted to the cooking utensil at a point diametrically opposed to the lip and shiftable about the pivot thereof from a position where it extends outwardly from the utensil to a position where it overlies the same, said handle including a lip engaging portion having latching engagement with the lip when the handle is in the last named position to thereby prevent displacement of the handle with relation to the pan, said handle being formed in two slidably engaged sections having a combined length when collapsed slightly greater than the diameter of the utensil, the section connected to the pan including arms converging toward the outer end of the section, the other of the sections having arms the ends of which have portions slidably embracing the arms of the first named sections, the arms of the last named section normally converging.

4. A cooking utensil having a lip, a handle pivoted to the cooking utensil at a point diametrically opposed to the lip and shiftable about the pivot thereof from a position where it extends outwardly from the utensil to a position where it overlies the same, said handle including a lip engaging portion having latching engagement with the lip when the handle is in the last named position to thereby prevent displacement of the handle with relation to the pan, said handle being formed in two slidably engaged sections having a combined length when collapsed slightly greater than the diameter of the utensil, the section connected to the pan including arms converging toward the outer end of the section, the other of the sections having arms the ends of which have portions slidably embracing the arms of the first named sections, the arms of the last named section normally converging, there being a connection between the outer ends of the arms of the first named section including said lip engaging portion.

5. A cooking utensil having a lip, a handle pivoted to the cooking utensil at a point diametrically opposed to the lip and shiftable about the pivot thereof from a position where it extends outwardly from the utensil to a position where it overlies the same, said handle including a lip engaging portion having latching engagement with the lip when the handle is in the last named position to thereby prevent displacement of the handle with relation to the pan, said handle being formed in two slidably engaged sections having a combined length when collapsed slightly greater than the diameter of the utensil, the section connected to the pan including arms converging toward the outer end of the section, the other of the sections having arms the ends of which have portions slidably embracing the arms of the first named sections, the arms of the last named section normally converging, there being a connection between the outer ends of the arms of the first named section including said lip engaging portion, and a pair of eyes through which the arms of the last named section are slidably directed.

In testimony whereof I hereunto affix my signature.

WILLIAM L. MARTIN.